US012651353B2

(12) United States Patent
Sasatani et al.

(10) Patent No.: US 12,651,353 B2
(45) Date of Patent: Jun. 9, 2026

(54) OBJECT TRACKING DEVICE

(71) Applicant: HITACHI ASTEMO, LTD.,
Hitachinaka (JP)

(72) Inventors: So Sasatani, Tokyo (JP); Goshi Sasaki,
Tokyo (JP); Trongmun Jiralerspong,
Tokyo (JP)

(73) Assignee: HITACHI ASTEMO, LTD.,
Hitachinaka (JP)

( * ) Notice: Subject to any disclaimer, the term of this
patent is extended or adjusted under 35
U.S.C. 154(b) by 337 days.

(21) Appl. No.: 18/549,399

(22) PCT Filed: Mar. 7, 2022

(86) PCT No.: PCT/JP2022/009748
§ 371 (c)(1),
(2) Date: Sep. 7, 2023

(87) PCT Pub. No.: WO2022/215409
PCT Pub. Date: Oct. 13, 2022

(65) Prior Publication Data
US 2024/0153106 A1 May 9, 2024

(30) Foreign Application Priority Data

Apr. 5, 2021 (JP) ................................. 2021-064048

(51) Int. Cl.
G06T 7/246 (2017.01)
G06V 10/25 (2022.01)
(52) U.S. Cl.
CPC .............. G06T 7/246 (2017.01); G06V 10/25
(2022.01); *G06T 2207/20076* (2013.01);
(Continued)

(58) Field of Classification Search
CPC ........... G06T 7/246; G06T 2207/20076; G06T
2207/30241; G06T 2207/30252;
(Continued)

(56) References Cited

U.S. PATENT DOCUMENTS 8,971,575 B2 * 3/2015 Chang ..................... G06T 7/277
382/103
10,248,887 B2 * 4/2019 Sato ........................ H04N 23/71
(Continued)

FOREIGN PATENT DOCUMENTS

CN 111553282 A * 8/2020 ............. G06N 3/045
CN 110472594 B * 12/2022 ............... G06N 3/08
(Continued)

OTHER PUBLICATIONS

International Search Report with English Translation and Written
Opinion of International Patent Application No. PCT/JP2022/
009748 dated May 17, 2022 (8 pages).

*Primary Examiner* — Stephen R Koziol
*Assistant Examiner* — Benedict E Lee
(74) *Attorney, Agent, or Firm* — Foley & Lardner LLP

(57) ABSTRACT

An object of the present invention is to generate a highly
accurate trail by correcting detection box information of an
object in an object tracking apparatus that generates a trail
of an object within a measurement range. According to the
present invention, there is provided an object tracking appa-
ratus (100) that generates a trail of an object within a
measurement range of a camera (2), the object tracking
apparatus (100) including: an object detecting unit (4) that
detects an object for each of a plurality of frames acquired
by a sensor; a detection box reliability calculating unit (8)
that calculates a reliability of a detection box based on flow
information between frames of the detection box in which
the object has been detected; a detection box position
correcting unit (9) that corrects detection box information of
(Continued)

a low-reliability detection box, using detection box information of a high-reliability detection box; and a trail generating unit (10) that generates a trail of an object, using the corrected detection box information.

9 Claims, 14 Drawing Sheets

(52) U.S. Cl.
CPC ............... *G06T 2207/30241* (2013.01); *G06T 2207/30252* (2013.01); *G06V 2201/07* (2022.01)

(58) Field of Classification Search
CPC .... G06T 7/277; G06V 10/25; G06V 2201/07; G06V 10/82; G06V 20/58; G06V 20/70
See application file for complete search history.

(56) References Cited

U.S. PATENT DOCUMENTS

| | | | | |
|---|---|---|---|---|
| 10,628,961 | B2 * | 4/2020 | Sundaresan | ............... G06T 7/20 |
| 11,238,296 | B2 * | 2/2022 | Tang | ...................... G06V 20/58 |
| 2021/0004967 | A1 | 1/2021 | Akiyama | |

FOREIGN PATENT DOCUMENTS

| | | | | |
|---|---|---|---|---|
| JP | 2006-323437 | A | | 11/2006 |
| JP | 6891984 | B1 * | | 6/2021 |
| WO | WO-2019/180917 | A1 | | 9/2019 |

* cited by examiner

| TARGET | CLASS | RELIABILITY | START POINT X | START POINT Y | HORIZONTAL WIDTH | VERTICAL LENGTH |
|--------|-------|-------------|---------------|---------------|------------------|-----------------|
| 12 | Person | 0.8 | X1 | Y1 | Width1 | Height1 |
| 13 | Car | 0.9 | X2 | Y2 | Width2 | Height2 |

15

FIG. 4
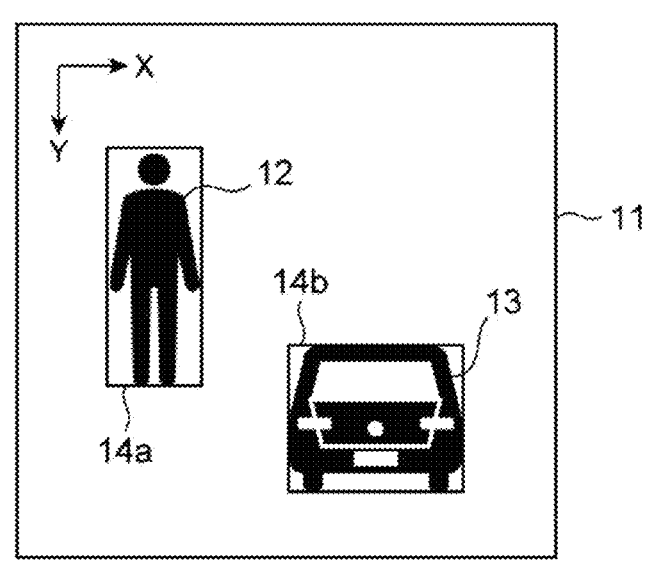
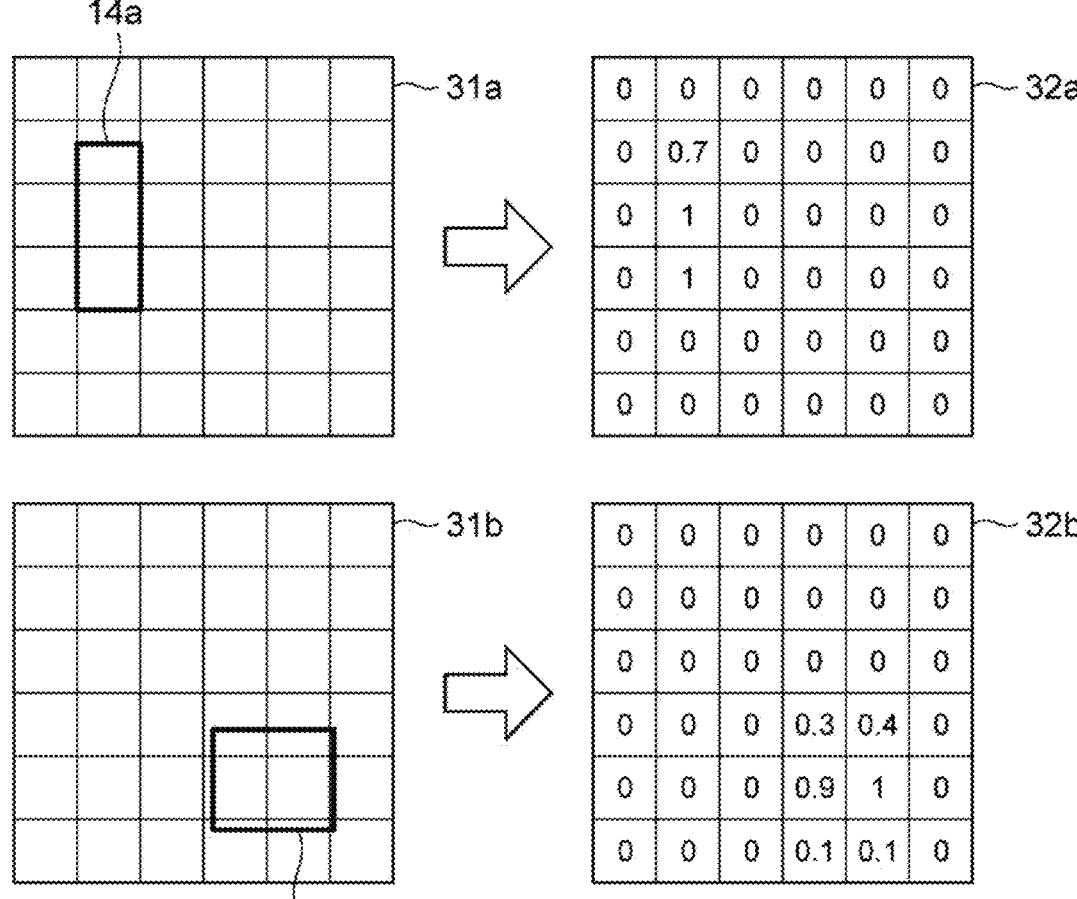

$$f(x) = \frac{1}{\sqrt{2\pi\sigma^2}} \exp\left(-\frac{(x - x_c)^2}{2\sigma^2}\right)$$

$$f(y) = \frac{1}{\sqrt{2\pi\sigma^2}} \exp\left(-\frac{(y - y_c)^2}{2\sigma^2}\right)$$

FIG. 6
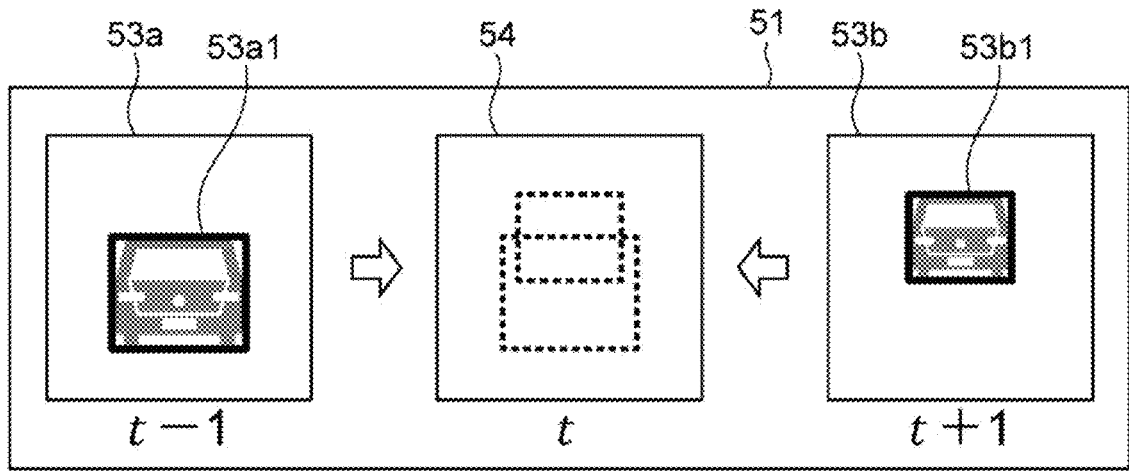
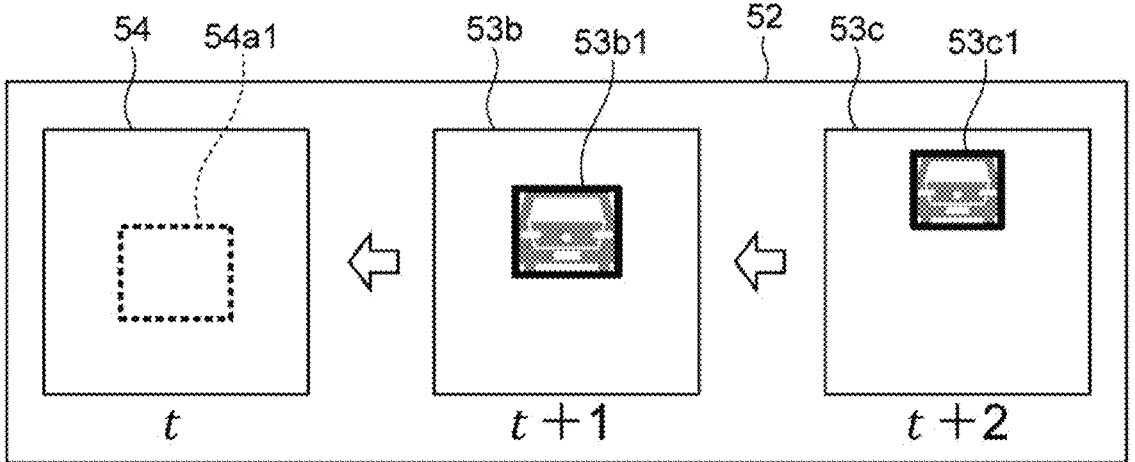

Figure 12:
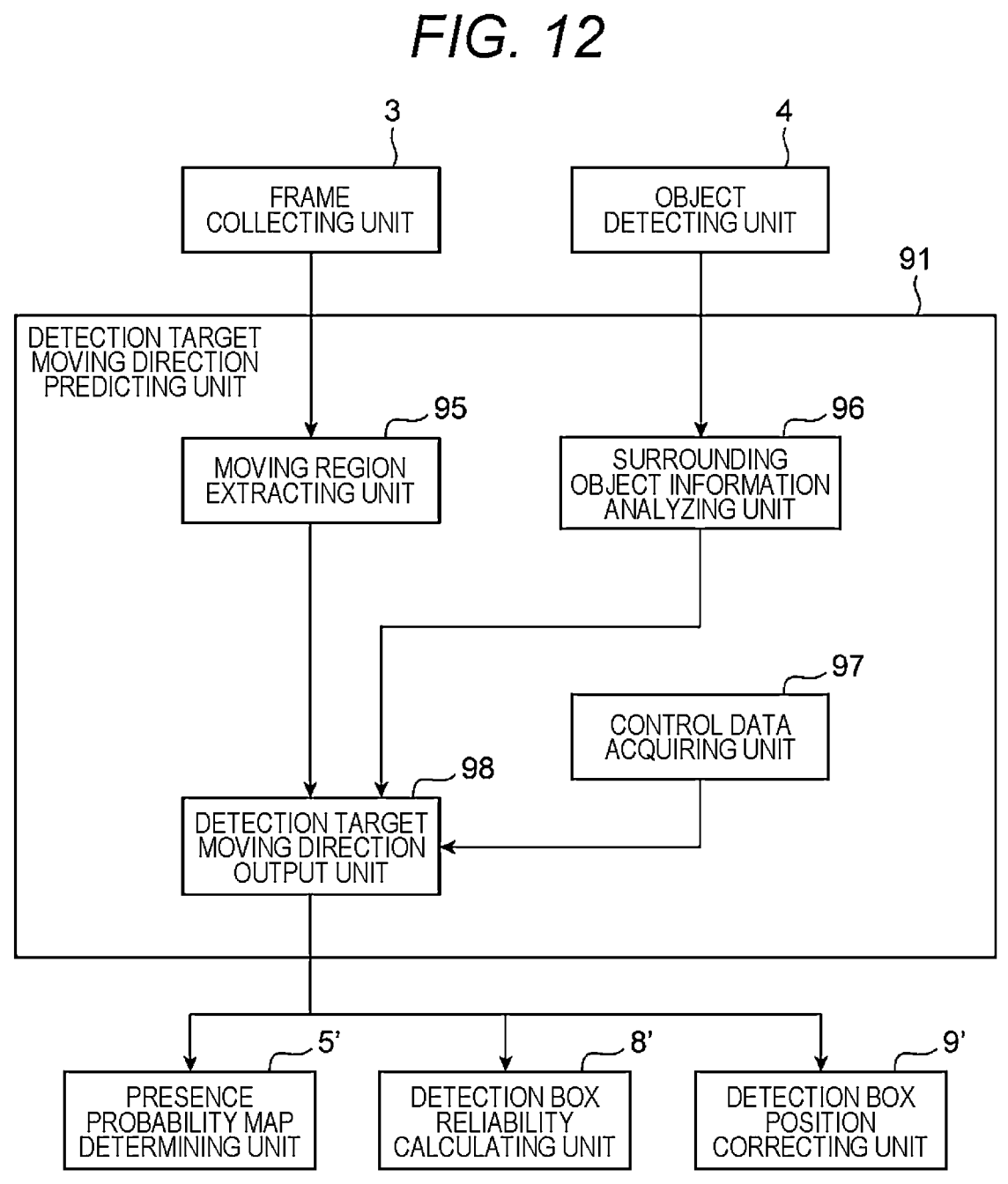

┌─────────────────────┐          ┌─────────────────────┐
│       FRAME         │          │      OBJECT         │
│   COLLECTING UNIT   │          │  DETECTING UNIT     │
└─────────────────────┘          └─────────────────────┘
                                                              91
┌──────────────────────────────────────────────────────────────┐
│ DETECTION TARGET                                               │
│ MOVING DIRECTION                                               │
│ PREDICTING UNIT                                                │
│                              95                        96      │
│  ┌────────────────────┐          ┌─────────────────────┐      │
│  │   MOVING REGION    │          │    SURROUNDING      │      │
│  │  EXTRACTING UNIT   │          │ OBJECT INFORMATION  │      │
│  └────────────────────┘          │   ANALYZING UNIT    │      │
│                                   └─────────────────────┘      │
│                                                     97         │
│                                   ┌─────────────────────┐      │
│                                   │   CONTROL DATA      │      │
│                              98   │  ACQUIRING UNIT     │      │
│                                   └─────────────────────┘      │
│  ┌────────────────────┐                                       │
│  │ DETECTION TARGET   │                                       │
│  │ MOVING DIRECTION   │◄──────────                            │
│  │   OUTPUT UNIT      │                                       │
│  └────────────────────┘                                       │
└──────────────────────────────────────────────────────────────┘

5'                  8'                  9'
┌────────────────────┐ ┌────────────────────┐ ┌────────────────────┐
│     PRESENCE       │ │  DETECTION BOX     │ │  DETECTION BOX     │
│ PROBABILITY MAP    │ │   RELIABILITY      │ │    POSITION        │
│ DETERMINING UNIT   │ │ CALCULATING UNIT   │ │ CORRECTING UNIT    │
└────────────────────┘ └────────────────────┘ └────────────────────┘
```

*FIG. 14*

$$f(x) = \frac{1}{\sqrt{2\pi\sigma^2}} \exp\left(-\frac{(x-x_c)^2}{2\sigma^2}\right)$$

*FIG. 15*

$$f(y) = \frac{1}{\sqrt{2\pi\sigma^2}} \exp\left(-\frac{(y-y_c)^2}{2\sigma^2}\right)$$

$$\text{RELIABILITY} = \frac{\alpha \cdot \text{NUMBER OF 3D OBJECT FEATURES} - \beta \cdot \text{NUMBER OF FLAT SURFACE FEATURES}}{\text{HORIZONTAL WIDTH OF DETECTION BOX} \times \text{VERTICAL LENGTH OF DETECTION BOX}}$$

$$\alpha, \beta : \text{CONSTANT}$$

OBJECT TRACKING DEVICE

TECHNICAL FIELD

The present invention relates to an object tracking apparatus.

BACKGROUND ART

In recent years, there has been an increasing need for a video recognition technology that generates information of a trail by tracking a detection target by analyzing a video acquired by a monitoring camera, an onboard camera, or the like. In particular, the information of the trail from a bird's-eye view can be easily visualized by being projected on a two-dimensional map and can be used for work behavior management, abnormal motion detection, and the like of a target. Examples of a method of generating the trail include a method of calculating a distance from a camera to a detection target in each frame of a camera image, acquiring three-dimensional positional information, and integrating the positional information for each frame. As an example of distance calculation, a method of using camera parameters and circumscribed rectangle information of a target obtained by detecting the target from a camera image is generally used. Here, the camera parameters can be estimated by performing imaging in an ideal environment in advance, but the circumscribed rectangle information needs to be estimated from a camera image acquired at an actual imaging site. Therefore, in order to generate a highly accurate trail, there is a demand for a technology of estimating an accurate position of a circumscribed rectangle (hereinafter referred to as a detection box) irrespective of varying imaging sites. As the technology, for example, there is a method of using dictionary information created by machine learning such as a convolutional neural network. In machine learning, it is necessary to create learning data in advance, and it is sufficient if various scenes can be learned, but variations of scenes are limited in consideration of realistic man-hours. Therefore, depending on the camera installation environment, there are a case where a target is not detected or erroneously detected, and correct detection box information cannot be obtained, and a case where a background of the target is included in the detection box information and an accurate rectangular position cannot be estimated. PTL 1 proposes a method of correcting detection box information by performing an object tracking process and an object recognizing process in parallel, and PTL 2 proposes a method of correcting a rectangular position when a detection target is blocked by an obstacle by extracting image feature points and estimating a motion vector.

CITATION LIST

Patent Literatures

PTL 1: WO 2019/180917
PTL 2: JP 2006-323437 A

SUMMARY OF INVENTION

Technical Problem

PTL 1 describes a technology for calculating trails of a plurality of targets with high accuracy by performing highly accurate object recognition at predetermined frame intervals and correcting ID information of a rectangle while tracking a detection target by an object tracking process and generating trails of the same target. However, a size or positional information of the rectangle cannot be corrected. In addition, in PTL 2, a position of a rectangle can be corrected by predicting the position of the rectangle after the next frame from motion vector information obtained from an image feature in a circumscribed rectangle of a detection target, but a size of the rectangle cannot be corrected.

According to the present invention to solve the above-described problems, an object of the present invention is to output a highly accurate trail of a detection target by correcting a detection box position according to a reliability calculated from flow information in an object tracking apparatus that generates a trail of an object within a measurement range.

Solution to Problem

In order to achieve the above-described object, the present invention provides an object tracking apparatus that generates a trail of an object within a measurement range of a sensor, the object tracking apparatus including: an object detecting unit that detects an object for each of a plurality of frames acquired by the sensor; and a detection box reliability calculating unit that calculates a reliability of a detection box based on flow information between frames of the detection box in which the object has been detected; a detection box position correcting unit that corrects detection box information of a low-reliability detection box having a reliability lower than a reliability of a high-reliability detection box, by using detection box information of the high-reliability detection box having a reliability higher than a threshold; and a trail generating unit that generates a trail of the object, using the corrected detection box information.

Advantageous Effects of Invention

By applying an object tracking apparatus of the present invention in accordance with the above-described features, it is possible to correct detection box information of a detection target and generate a highly accurate trail.

Additional features related to the present invention will be clarified from the description of the present specification and the accompanying drawings. In addition, problems, configurations, and effects other than those described above will be clarified by the following description of embodiments.

BRIEF DESCRIPTION OF DRAWINGS

FIG. 4 is a diagram for describing a presence probability map creating unit 21.

FIG. 6 is a diagram for describing a presence probability map interpolating unit 22.

FIG. 12 is a configurational diagram of a detection target moving direction predicting unit 91.

FIG. 14 is a diagram illustrating Expression 1.

FIG. 15 is a diagram illustrating Expression 2.

FIG. 16 is a diagram illustrating Expression 3.

FIG. 17 is a diagram illustrating Expression 4.

DESCRIPTION OF EMBODIMENTS

Hereinafter, specific embodiments of the present invention will be described with reference to the drawings.

First Embodiment 1

Figure 1:
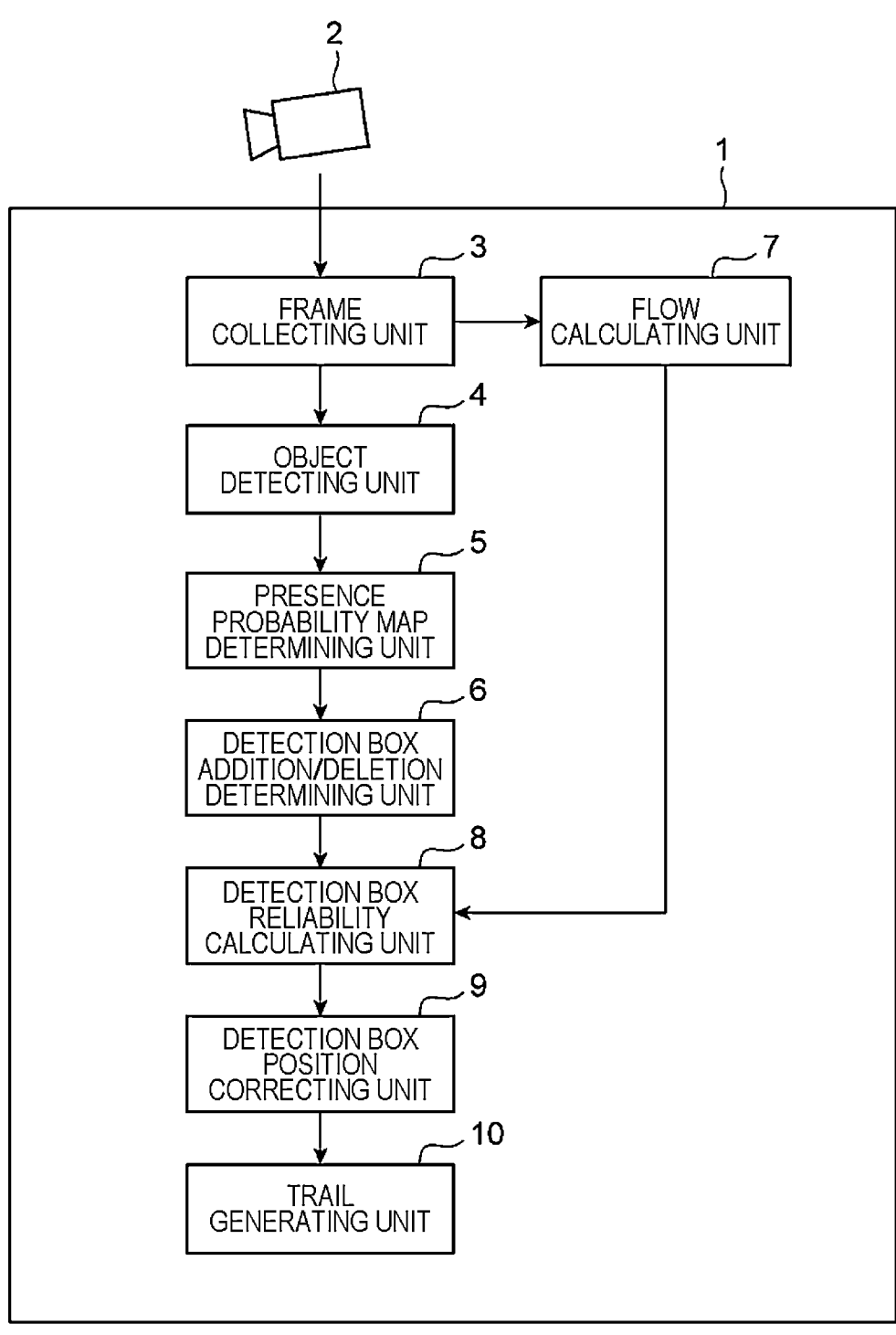
FIG. 1 is a functional block diagram of a first embodiment of the present invention.

FIG. 1 is a diagram illustrating a block configuration of a first embodiment of the present invention.

In this embodiment, an embodiment in a case where a measurement device is a camera will be described, but the measurement device is not limited thereto and can be applied to other sensors such as a stereo camera and a distance sensor. An object tracking apparatus 1 illustrated in FIG. 1 is an apparatus that corrects a detection box position from presence probability map information generated from object detection results of all frames captured by a camera 2 and reliability information of a detection box which is calculated from flow information and the like, and the object tracking apparatus 1 generates a highly accurate trail.

The camera 2 is attached to, for example, a vehicle body of an automobile and images a road surface and another vehicle in front of the vehicle. The object tracking apparatus 1 is a device that acquires an image captured by the camera 2 and analyzes a trail of an object as a detection target in front of the vehicle by performing an analyzing process. The object tracking apparatus 1 is realized by a calculator PC prepared separately from the camera 2. The calculator PC includes an arithmetic device, a main storage device, and an external storage device and implements functions of a frame collecting unit 3, the object detecting unit 4, a presence probability map determining unit 5, a detection box addition/deletion determining unit 6, a flow calculating unit 7, a detection box reliability calculating unit 8, a detection box position correcting unit 9, and a trail generating unit 10. Moreover, the object tracking apparatus 1 may be integrally provided inside the camera 2.

First, an outline of each function illustrated in FIG. 1 will be described. The frame collecting unit 3 has a function of collecting a captured image (frame) of the camera 2, the object detecting unit 4 has a function of detecting a detection target in all frames acquired by the frame collecting unit 3, the presence probability map determining unit 5 has a function of generating or interpolating a presence probability map of the detection target from an object detection result of each frame, the detection box addition/deletion determining unit 6 has a function of determining whether to add or delete a detection box in each frame by using the presence probability map information, the flow calculating unit 7 has a function of calculating flow information between frames, the detection box reliability calculating unit 8 calculates a reliability of a detection box from flow information in a final detection box output from the detection box addition/deletion determining unit 6, and the detection box position correcting unit 9 has a function of correcting a position or a size of a detection box according to the reliability of the detection box, and the trail generating unit 10 has a function of generating a trail of the detection target from the corrected detection box information. Hereinafter, details of functions of 3, 4, 5, 6, 7, 8, 9, and 10 will be described.

The frame collecting unit 3 collects frames that are captured images captured by the camera 2. A plurality of frames may be collected, and all of the frames in which the detection target is present may be collected, or frames automatically or manually selected from all of the frames may be collected. Examples of a selection method include, but are not particularly limited to, a method of automatically extracting a frame within a designated imaging time, a method of automatically extracting a frame in which a detection target is present within a measurement range in a video designated by a user, and a method of manually selecting a frame by the user through a graphical user interface (GUI) or the like.

Figure 2:
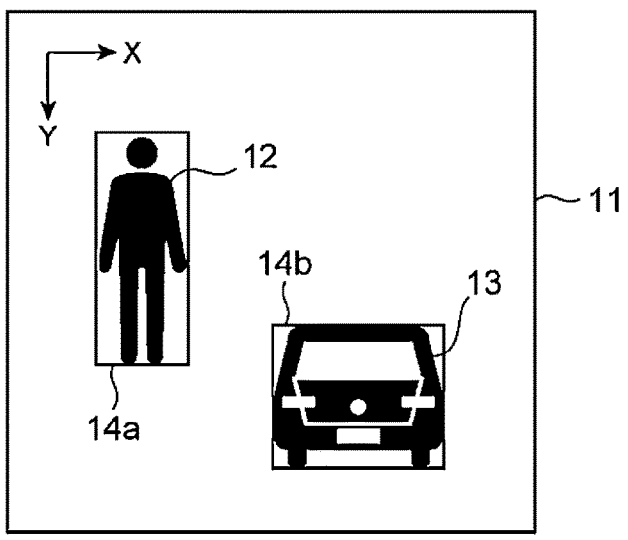
FIG. 2 is a diagram for describing an object detecting unit 4.

The object detecting unit 4 will be described with reference to FIG. 2.

The object detecting unit 4 detects a detection target for each of the plurality of frames collected by the frame collecting unit 3. In FIG. 2, reference numeral 11 denotes a captured image (frame), reference numerals 12 and 13 denote detection targets (a person and a car in the example), reference numerals 14*a* and 14*b* denote examples of a detection box indicating a region which includes a target object and is estimated from the image by the object detecting unit 4, and reference numeral 15 denotes an example of detection box information. The object detecting unit 4 detects a detection target present in a captured image by utilizing an event in which a target object can be detected from an image generated in advance from learning data by machine learning or the like. An algorithm for generating a detecting dictionary may be a general algorithm such as a convolutional neural network or AdaBoost and is not particularly limited. The object detecting unit 4 detects a target object in a plurality of frames acquired by the frame collecting unit 3 by using the dictionary and stores detection box information as illustrated in 15 of FIG. 2. The detection box information includes, for each detected target, class information indicating a type of target, reliability information indicating accuracy of the class information, start points (X, Y) indicating upper left image coordinates of the detection boxes 14*a* and 14*b*, information on a horizontal width and a vertical width of the detection box, and the like. Moreover, a method other than the example may be used as long as the method is means for enabling a position of a detection target to be estimated in an image.

Figure 3:
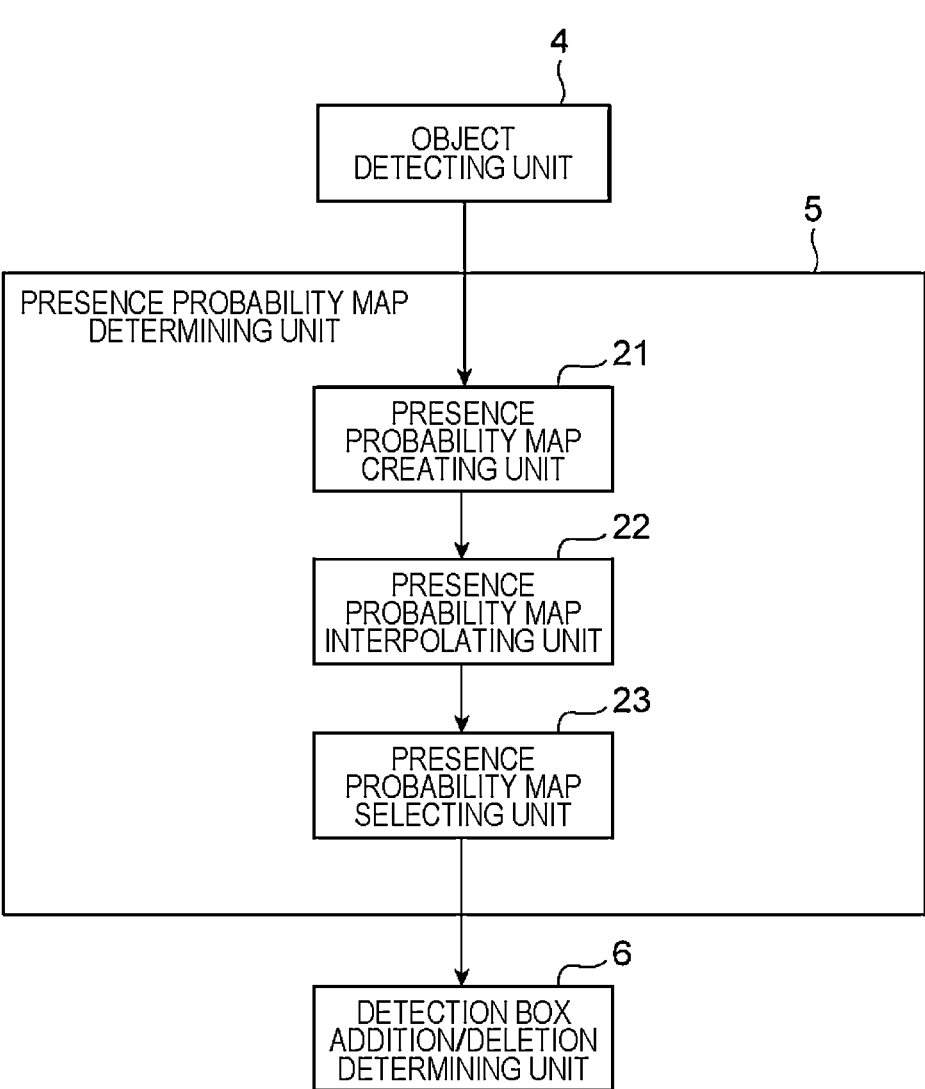
FIG. 3 is a configurational diagram of a presence probability map determining unit 5.

FIG. 3 illustrates a block configuration of the presence probability map determining unit 5.

The presence probability map determining unit 5 performs a process of generating a presence probability map indicating a presence probability of a detection target in each of the plurality of frames. The presence probability map determining unit 5 includes a presence probability map creating unit 21 that creates a presence probability map in each frame from the detection box information output from the object detecting unit 4, a presence probability map interpolating unit 22 that interpolates information of presence probability maps of two or more previous and following frames of a target frame and generates an interpolated presence probability map of the target frame, and a presence probability map selecting unit 23 that compares the presence probability map with the interpolated presence probability map and selects a final presence probability map for each frame. Hereinafter, 21, 22, and 23 will be described in detail.

The presence probability map creating unit 21 will be described with reference to FIG. 4.

The presence probability map creating unit 21 generates a presence probability map indicating a presence probability of an object in each of a plurality of frames. The presence probability map creating unit 21 calculates a presence probability map for each class of the detection target from the detection box information, for each frame.

The presence probability map creating unit 21 generates a presence probability map by using any one or a plurality of items of information of a probability density function calculated by a normal distribution from positional information and reliability information of a detection box of an object detected by the object detecting unit 4 and an object detection result by a plurality of different dictionaries.

As a method of generating the presence probability map, for example, there is a method of dividing the captured image 11 into a plurality of small regions such as 31a and 31b, calculating a degree of overlap between the detection box 14a or 14b of each class and each small region by a ratio, and generating the presence probability maps such as 32a and 32b. Moreover, the number of divisions of the small regions is not particularly limited and may be determined in consideration of specifications of a calculator PC that executes the process or the like, or the presence probability map may be generated by dividing the frame into a plurality of regions after reducing the resolution of the frame in advance.

Figure 5:
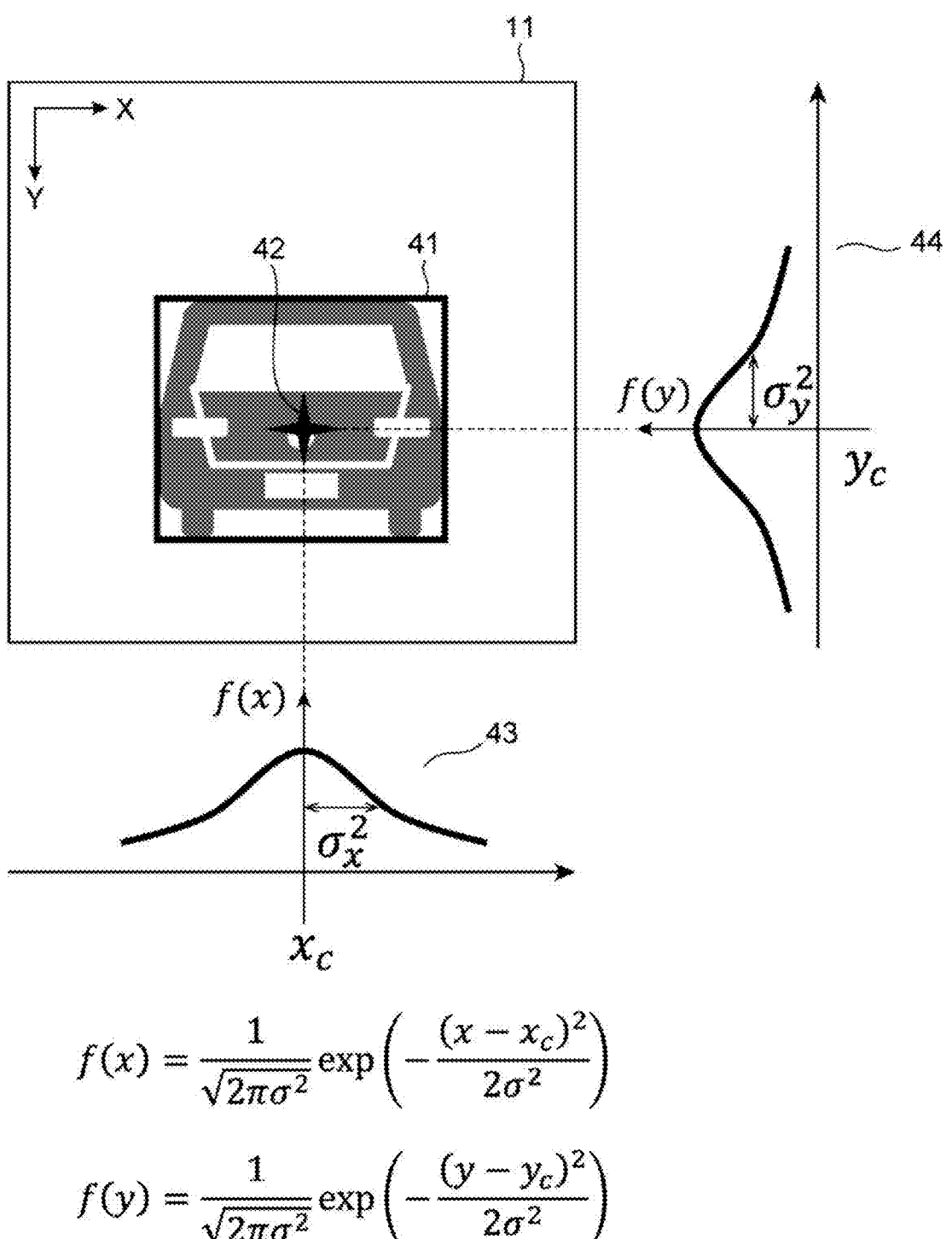
FIG. 5 is an example of a method for creating a presence probability map.

In addition, a value of the presence probability map is not particularly limited as long as the value indicates a ratio of presence of a target of each class in the small region, and a method of utilizing a probability density function as illustrated in FIG. 5 may be used instead of using the degree of overlap of the detection box.

FIG. 5 is a diagram illustrating an example of a method for creating a presence probability map.

In FIG. 5, reference numeral 11 denotes a captured image, reference numeral 41 denotes a detection box, reference numeral 42 denotes a center coordinate $(x_c, y_c)$ of the detection box, and reference numerals 43 and 44 denote probability density functions f(x) and f(y) for each of an X direction and a Y direction of image coordinate axes used to calculate the presence probability map. As a method for creating the probability density function f(x) in the X direction, the probability density function f(x) is calculated by a normal distribution expressed in Expression 1 in FIG. 14 in which an average value is expressed by an x-coordinate $x_c$ and the variance $\sigma^2$ of an image center. Similarly, the probability density function f(y) in the Y direction is calculated by Expression 2 in FIG. 15, and a product of f(x) and f(y) is obtained by Expression 3 in FIG. 16, and thereby a presence probability map f(x, y) can be generated. Moreover, a value of the variance $\sigma^2$ may be obtained using a method of determining the value on the basis of information of a horizontal width and a vertical width of the detection box, a method of determining the value on the basis of information or the like of the aspect ratio of the horizontal width and the vertical width in a case where actual measurement information of the detection target can be grasped in advance, or the like. In addition, a method of adjusting a value of a presence probability of a detection object by multiplying a presence probability map f(x, y) by reliability information of the detection box may also be employed.

The presence probability map interpolating unit 22 will be described with reference to FIG. 6.

The presence probability map interpolating unit 22 performs a process of estimating a presence probability map of a frame (target frame) from presence probability map information of previous and following frames t−1 and t+1 of a frame t, presence probability map information of a plurality of previous frames, or presence probability map information of a plurality of following frames t+1 and t+2. An interpolation method performed by the presence probability map interpolating unit 22 is roughly divided into methods of two patterns indicated by 51 and 52 in FIG. 6.

In the method illustrated in 51 of FIG. 6, an interpolated presence probability map corresponding to a t-th frame 54 is generated from a presence probability map of the previous and following frames of the t-th frame 54, that is, a (t−1)-th frame 53a and a (t+1)-th frame 53b. Examples of a generation method include a method of obtaining a product or an average value of the presence probabilities of the presence probability maps of the (t−1)-th frame 53a and the (t+1)-th frame 53b, respectively. In an example illustrated in 51 of FIG. 6, a presence probability map of the vehicle in the (t−1)-th frame 53a is generated on the basis of detection box information of a detection box 53a1, and a presence probability map of the vehicle in the (t+1)-th frame 53b is generated on the basis of detection box information of a detection box 53b1. The presence probability map interpolating unit 22 calculates a product or an average value of presence probabilities of the presence probability map of the vehicle in the (t−1)-th frame 53a and the presence probability map of the vehicle in the (t+1)-th frame 53b and generates an interpolated presence probability map of the t-th frame 54.

In the method illustrated in 52 of FIG. 6, the interpolated presence probability map corresponding to the t-th frame 54 is estimated on the basis of a change amount from the presence probability map of a (t+2)-th frame 53c to the presence probability map of the (t+1)-th frame 53b. For example, there is a method of estimating an approximate position of the detection box in the t-th frame 54 from changes of the center position, the vertical width, and the horizontal width of the (t+2)-th and (t+1)-th detection boxes 53c1 and 53b1, then enlarging or reducing the presence probability map corresponding to the (t+1)-th frame 53b by linear interpolation or the like depending on a change in size of a detection box to obtain a size and a position of a detection box 54a1 in the t-th frame, and calculating the interpolated presence probability map corresponding to the t-th frame 54. In the example, the method of calculating the interpolated presence probability map of the t-th frame from the previous and following frames of the t-th frame or from the (t+1)-th and (t+2)-th frames has been described. However, the interpolated presence probability map of the frame may be calculated from each of a plurality of previous and following frames of the corresponding frame, or the interpolated presence probability map of the corresponding frame may be calculated from the (t−1)-th frame and the (t−2)-th frame which are the plurality of previous frames of the corresponding frame.

Moreover, in addition to this, there is no particular limitation as long as a method of estimating the presence probability map of the corresponding frame (target frame) from the presence probability map information of the previous and following frames is used. In the example, in all frame groups acquired by the frame collecting unit 3, an interpolated presence probability map is generated for a head frame by the method illustrated in 52, an interpolated presence probability map is generated for the final frame by a reverse flow of the method illustrated in 52, and an interpolated presence probability map is generated for the other frames by the method illustrated in 51.

The presence probability map selecting unit 23 selects a final presence probability map from the presence probability maps and the interpolated presence probability maps in the respective frames. Examples of the selection method include, but are not particularly limited to, a method of calculating a difference between the presence probability map and the interpolated presence probability map and adopting a value of the interpolated presence probability map only for a small region in which the difference is equal to or larger than a threshold, and a method of calculating a product or an average value of the presence probability map and the interpolated presence probability map and setting the presence probability value of the small region which is less than the threshold to 0.

By the method described above, the presence probability map determining unit 5 determines the presence probability map in each frame. Moreover, in the example, the flow has been described in which two of the presence probability map and the interpolated presence probability map are generated in each frame, and then a final value is determined by the presence probability map selecting unit 23; however, a plurality of interpolated presence probability maps in a frame may be generated. For example, other than the head frame and the final frame in the frame group, a method of generating three types of interpolated presence probability maps by a technique of performing the flows 51 and 52 and a reverse flow of 52, and then similarly determining the final value by the presence probability map selecting unit 23, a method of increasing the number of previous and following frames being used for interpolation or increasing patterns of the interpolated presence probability map, or the like may be used.

In addition, in the flow, the interpolated presence probability map is created in all of the frames, but a method of generating the interpolated presence probability map only in some frames and correcting the presence probability map of the corresponding frame may be employed. For example, the present invention is not particularly limited to a method of correcting a presence probability map only for a frame in which the reliability of detection box information is equal to or lower than a threshold, a method of counting the number of detection boxes of the detection target in each frame and obtaining an average value thereof, and then performing correction only in a frame having the number of detection boxes other than the average value, or a method of correcting only a frame selected by the user using a GUI or the like, or the like. In each frame, a method of using, as the interpolated presence probability map, the presence probability map generated by acquiring detection box information of a detection target by using a plurality of different dictionaries and correcting the presence probability map by the presence probability map selecting unit 23 may be used.

The detection box addition/deletion determining unit 6 performs a process of determining addition or deletion of a detection box in each of a plurality of frames by using the presence probability map. The detection box addition/deletion determining unit 6 determines whether to add or delete the detection box in each frame by using the presence probability map information output by the presence probability map determining unit 5. As a determination method, there is a method of adding, as a detection box, a circumscribed rectangle of a region having a presence probability equal to or higher than a threshold when there is no detection box near the region having the presence probability equal to or higher than the threshold, and deleting the corresponding detection box when a detection box is present in a region having a presence probability equal to or lower than the threshold. A criterion for determining whether the detection box is present in the presence probability map is not particularly limited, and examples thereof include a method of having the detection box present in the vicinity of the presence probability map when an inclusion rate of the small region satisfying the threshold of the presence probability map in the detection box or the Euclidean distance between a center coordinate of the detection box and the small region satisfying the threshold of the presence probability map falls within a designated range. In addition, when the detection box is added by the detection box addition/deletion determining unit 6, a process of increasing a size of the detection box by a designated margin may be added in anticipation that the position of the detection box will be corrected by the detection box position correcting unit 9 at a subsequent stage.

Figure 7:
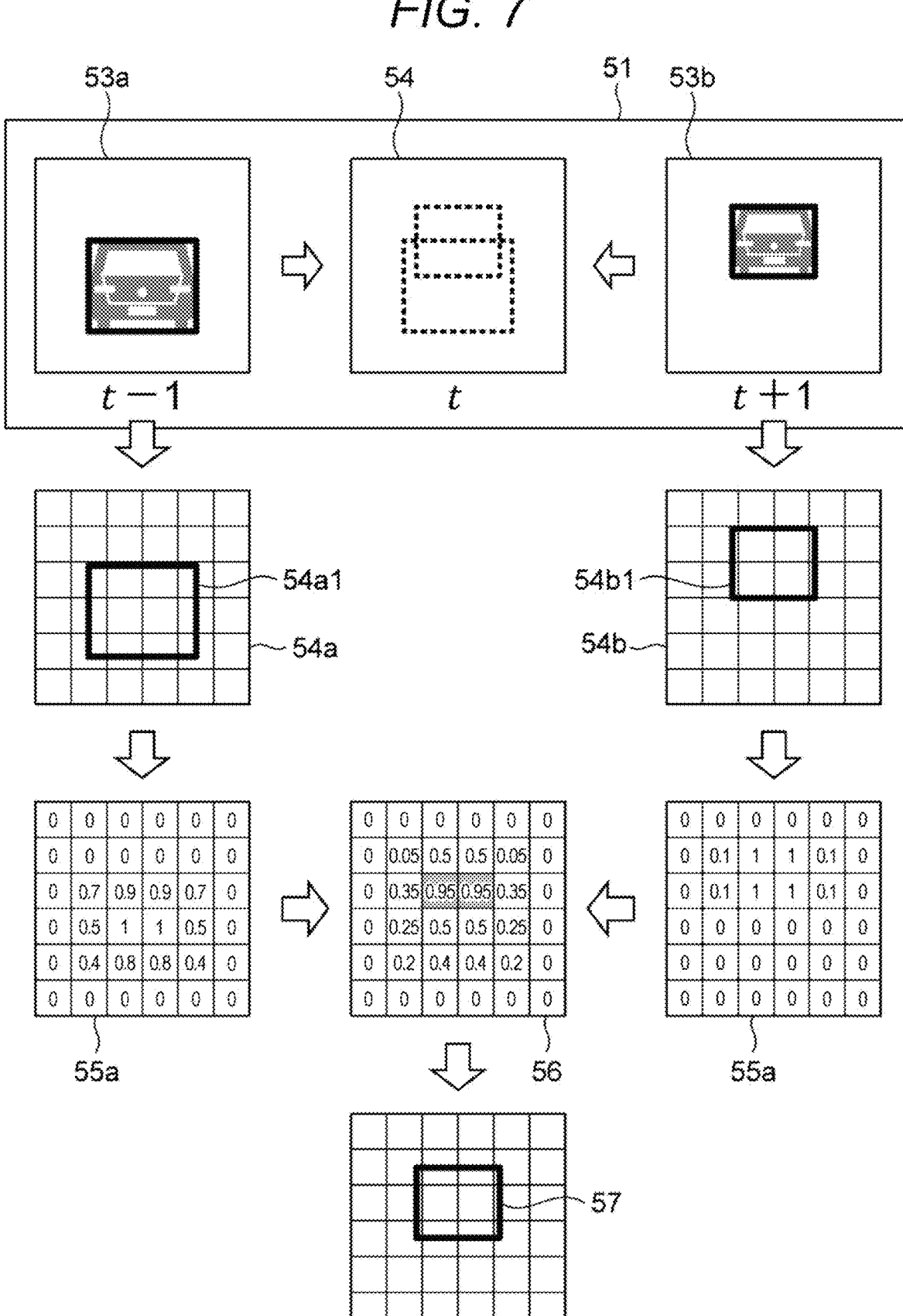
FIG. 7 is a diagram for describing a flow of adding a detection box.

A flow of estimating a presence probability map of the t-th frame from the detection box information of the (t−1)-th and (t+1)-th frames and adding a detection box 57 to the t-th frame will be described with reference to FIG. 7. First, the presence probability map creating unit 21 divides the (t−1)-th and (t+1)-th frames 53a and 53b into small regions 54a and 54b and generates presence probability maps 55a and 55b from overlapping rates with detection boxes 54a1 and 54b1. Next, by calculating an average of the presence probability maps 55a and 55b, a presence probability map 56 of the t-th frame is estimated. Finally, the detection box 57 is determined based on a predetermined threshold and a value of the presence probability map. In the example illustrated in FIG. 7, a value of each small region of the presence probability map is classified into three classes of less than 0.5, 0.5 or more and less than 0.9, and 0.9 or more, and the detection box 57 is determined on the basis of the condition that a small region of less than 0.5 is not included in the rectangle, all the small regions of 0.9 or more are included in the rectangle, and the small region of 0.5 or more and less than 0.9 is included in the rectangle but a half or more of the small regions are not included.

The flow calculating unit 7 will be described with reference to FIG. 8.

Figure 8:
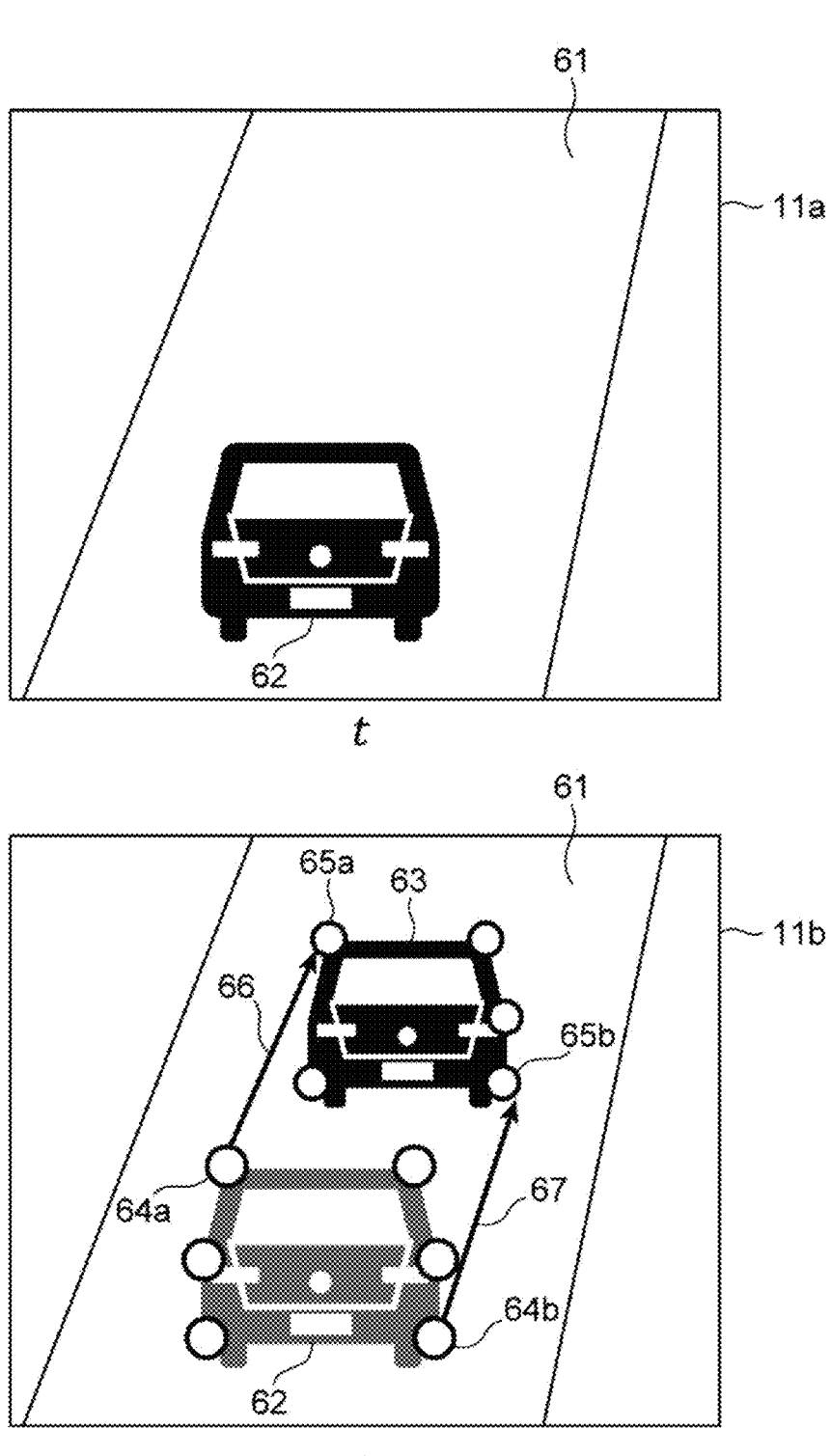
FIG. 8 is a diagram for describing a flow calculating unit 7.

FIG. 8 illustrates an example in which the flow calculating unit 7 analyzes image features of a t-th frame 11a and a (t+1)-th frame 11b to calculate flow information between frames. In FIG. 8, reference numeral 61 denotes a road surface, reference numeral 62 denotes a measurement target vehicle in the frame 11a, reference numeral 63 denotes a measurement target vehicle in the frame 11b, reference numerals 64a and 64b denote examples of image feature points in the vehicle 62, reference numerals 65a and 65b denote examples of image feature points in the vehicle 63, reference numeral 66 denotes flow information between the image feature points 64a and 65a, and reference numeral 67 denotes flow information between the image feature points 64b and 65b. The flow information is a motion vector of the same image feature point between frames and indicates a direction and a size of the vector. A method of acquiring the image feature point and the flow information is not particularly limited as long as the method is a method of enabling the same image feature point and flow information thereof to be calculated between the previous and following frames, such as a method of utilizing an optical flow by the Lucas-Kanade method or a method of obtaining flow information by tracking using an image feature such as SHIFT. In the example, the flow information other than the head frame is calculated from the corresponding frame (t-th frame) and the previous frame (t−1 frame), and the flow information of the head frame is acquired by inverting a sign of a numerical value calculated from the corresponding frame and the next frame ((t+1)-th frame).

The detection box reliability calculating unit 8 will be described with reference to FIG. 9.

The detection box reliability calculating unit 8 calculates the reliability of the detection box on the basis of the flow information between the frames in the detection box of the detected detection target. The detection box reliability calculating unit 8 calculates the reliability of the detection box by analyzing the flow information calculated by the flow calculating unit 7 in detection box information of final object detection output from the detection box addition/deletion determining unit 6.

Figure 9:
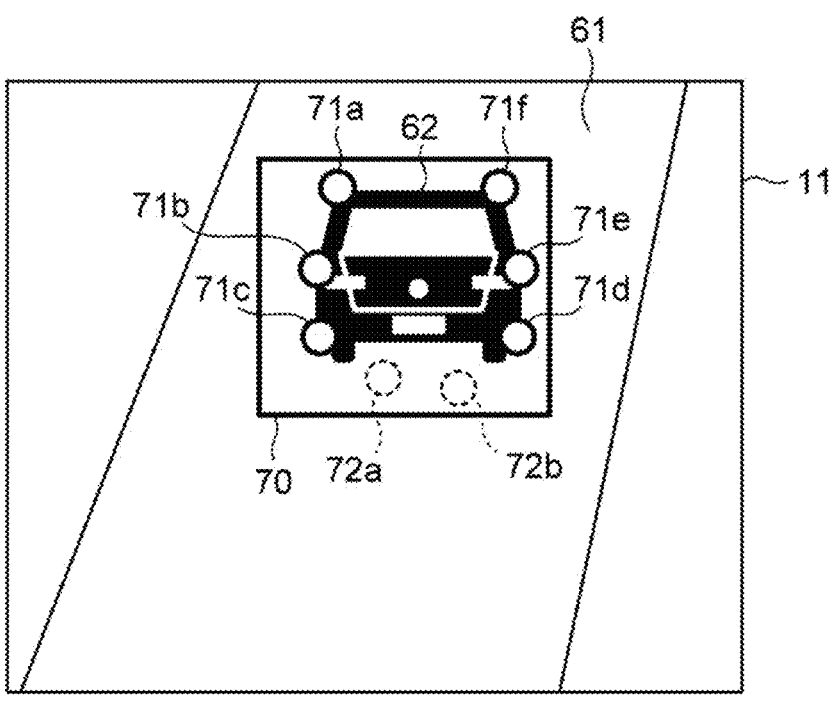
FIG. 9 is a diagram for describing a detection box reliability calculating unit 8.

In the captured image 11 in which the vehicle 62 that is a detection target is traveling on the road surface 61 illustrated in FIG. 9, a final detection box 70 and image feature points 71a to 71f output from the detection box addition/deletion determining unit 6 are examples of image feature points having flow information in the vehicle, and image feature points 72a and 72b are examples of image feature points having flow information in the road surface. The optical flow is generally used to calculate flow information of a moving body between frames. Therefore, in a case where the camera is fixed like a monitoring camera, the image feature point and the flow information of the moving object are easily calculated, and the image feature point and the flow information in a background such as a road surface are hardly calculated. In addition, in a case of a dynamic camera such as an onboard camera, the image feature point and the flow information of the moving object can be similarly calculated, and the image feature point in the background such as the road surface is easily calculated as compared with a fixed camera, but the flow information thereof tends to be small.

Therefore, in the example, an image feature point having flow information larger than a predetermined threshold is set as a moving body feature point (three-dimensional object feature point), and an image feature point having flow information smaller than the threshold is set as a planar feature point (road surface feature point), and the reliability of the detection box 70 is calculated from an inclusion rate of the moving body feature point and the planar feature point in the detection box 70. That is, the detection box reliability calculating unit 8 calculates the reliability of the detection box on the basis of information of the three-dimensional object feature point and the road surface feature point in the detection box. As a calculation method, as in (Expression 4) of FIG. 17, a method of obtaining a ratio of a difference between the number of moving body feature points and the number of planar feature points to a size of the detection box, or a method of improving the reliability as there is a three-dimensional object feature point having large flow information and decreasing the reliability as there is a planar feature point having small flow information by considering the size of the flow information for each feature point of (Expression 4) may be employed. In addition, the reliability may be calculated in consideration of the direction of the flow information in (Expression 4). For example, there is a method or the like of using the fact that the flow directions are similar in a case of the image feature points of the same moving body and increasing the reliability of the detection box as the number of three-dimensional object feature points indicating similar flow directions is larger in the detection box.

Moreover, in the example, the reliability of the detection box is calculated using the flow information, but the reliability may be calculated using image information that can distinguish between the moving object (three-dimensional object) and the background. For example, a method of obtaining an inter-frame difference and then determining that a region is more likely to be the region of the moving body as regions having the difference are more in the detection box, and calculating the reliability based on the inclusion rate of the regions having the difference to an area of the detection box, or a method of executing edge detection or the like in the detection box to estimate a contour candidate of the detection target and determining that a detection box having a high overlapping rate of the regions between the circumscribed rectangle of the contour and the detection box is a detection box having a high reliability may be used.

Figure 10:
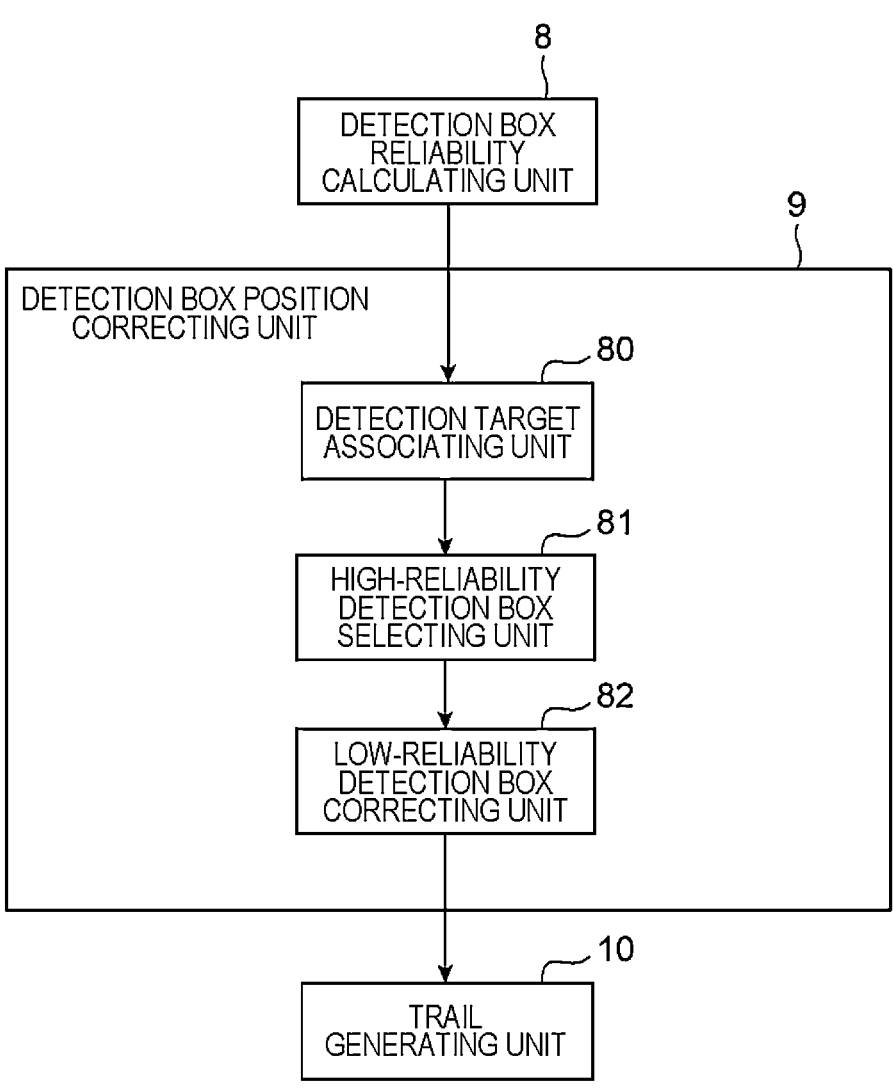
FIG. 10 is a configurational diagram of a detection box position correcting unit 9.

FIG. 10 is a diagram illustrating a block configuration of the detection box position correcting unit 9.

The detection box position correcting unit 9 performs a process of correcting detection box information of a low-reliability detection box having a reliability lower than a reliability of a high-reliability detection box, by using detection box information of the high-reliability detection box having a reliability higher than a threshold. The detection box position correcting unit 9 includes a detection target associating unit 80 that associates detection targets considered to be the same from detection results of all of the frames, a high-reliability detection box selecting unit 81 that selects a detection box having the high reliability for each of the same detection targets, and a low-reliability detection box correcting unit 82 that corrects positional information of remaining low-reliability detection boxes in the same detection targets by using the selected high-reliability detection box information. Hereinafter, the functions will be described below.

The detection target associating unit 80 analyzes the detection box information of all the frames and imparts the same ID information to the detection boxes considered to be the same target. As means for determining the same target, there is a method of calculating a Euclidean distance of the center coordinates between all the detection boxes in the previous and following frames, and performing a process of determining the closest detection boxes as the same detection targets in all the frames. In addition to this method, there is no particular limitation as long as it is a method of determining whether or not the targets are the same target by a combinatorial optimization algorithm or the like using detection results of all the frames as inputs.

The high-reliability detection box selecting unit 81 collects information of detection boxes to which the same ID information is imparted by the detection target associating unit 80, and selects a plurality of items of information of detection boxes having a high reliability (high-reliability detection boxes). A selection method is not particularly limited, and examples thereof include a method of selecting all detection boxes having a reliability higher than or equal to a predetermined threshold and a method of selecting information of a designated number of detection boxes in descending order of reliability. In addition, information of detection boxes having the high reliability may be selected by utilizing an image feature, a GUI, or the like. For example, by estimating an abnormal captured image such as overexposed white-out according to the image feature, a method in which information of a detection box of the corresponding image is not used, or a method in which a user manually selects a detection box having a high reliability by a GUI or the like may be used.

The low-reliability detection box correcting unit 82 uses the detection box information selected by the high-reliability detection box selecting unit 81 to correct positional information of unselected detection boxes to which the same ID information is imparted. The positional information of the detection box is information of a position and a size of the detection box in the captured image as illustrated in 15 of FIG. 2. The correction method is not particularly limited as long as the method is a technique of enabling function approximation from a plurality of points, such as a method of collecting information on a center coordinate position, a horizontal width, and a vertical width of the detection box having a high reliability and calculating each of the center coordinate position, the horizontal width, and the vertical width of the detection box having a low reliability by a general interpolation technique such as a spline interpolation method. In addition, a method of utilizing a value of the reliability as weight information in the interpolation method may be used.

The trail generating unit 10 calculates a distance between the camera 2 and the detection target by using the detection box information output from the detection box position correcting unit 9, and generates a trail. As a technique of calculating a distance to the detection target, a general method using camera parameters is used. Specifically, among the camera parameters, image coordinates at a center of a lower end of the detection box in the detection target are converted into camera coordinates by using internal parameters including the focal length and the distortion correction coefficient. Accordingly, a position of the detection target in the real world coordinate can be estimated and the distance from the camera to the detection target can be calculated by assuming that a point of the three-dimensional world coordinates calculated from the camera coordinates at the center of the lower end by the external parameters indicating the installation posture and angle of the camera is present on the ground having the height of 0 in the real world. Moreover, a method of calculating a distance is not particularly limited as long as the method is a technique enabling the distance from the camera to the detection target to be estimated by the detection box information in the image. A trail can be acquired from a bird's-eye view by connecting the three-dimensional world coordinates obtained by calculating the distance from the camera to the target using all the detection box information of the same target.

In the first embodiment of the present invention, according to the functional configuration described above, in the object tracking apparatus that generates the trail of the object in the measurement range, the addition and the deletion of the detection box are adjusted from the presence probability map information generated from the object detection result of each frame, and the detection box position is corrected according to the reliability calculated from the flow information, so that the highly accurate trail of the detection target can be output.

The object tracking apparatus 1 of the embodiment detects the detection target for each of a plurality of frames acquired by the camera 2 and calculates the reliability of the detection box on the basis of flow information between the frames in the detection box of the detected detection target. Accordingly, the detection box information of the low-reliability detection box having the low reliability is corrected using the detection box information of the high-reliability detection box having the reliability higher than the threshold, and the trail is generated using the corrected detection box information.

According to the object tracking apparatus 1 of the embodiment, it is possible to reduce detection omission and erroneous detection of a detection target in a frame, reduce positional deviation of a detection box, and generate a highly accurate trail of the same detection target. Hence, for example, for ADAS quality or situation analysis at the time of the occurrence of a traffic accident, it is possible to estimate a trail of a vehicle traveling ahead from an in-vehicle image and compare the trail with CAN data. In this manner, it is possible to provide a service to be utilized for maintenance and inspection of an emergency braking operation, evaluation of whether or not behavior is correct, and the like.

Moreover, in the embodiment, the case where the object tracking apparatus 1 includes the presence probability map determining unit 5 and the detection box addition/deletion determining unit 6 has been described as an example, but a configuration in which these units are omitted can be employed. Even if the presence probability map determining unit 5 and the detection box addition/deletion determining unit 6 are omitted, the detection box information of the detection target can be corrected based on the detection box reliability by including the object detecting unit 4, the detection box reliability calculating unit 8, the detection box position correcting unit 9, and the trail generating unit 10, and a highly accurate trail can be generated using the corrected detection box information. In the embodiment, since the object tracking apparatus 1 includes the presence probability map determining unit 5 and the detection box addition/deletion determining unit 6, the detection accuracy of the detection box can be further improved.

Second Embodiment

Figure 11:
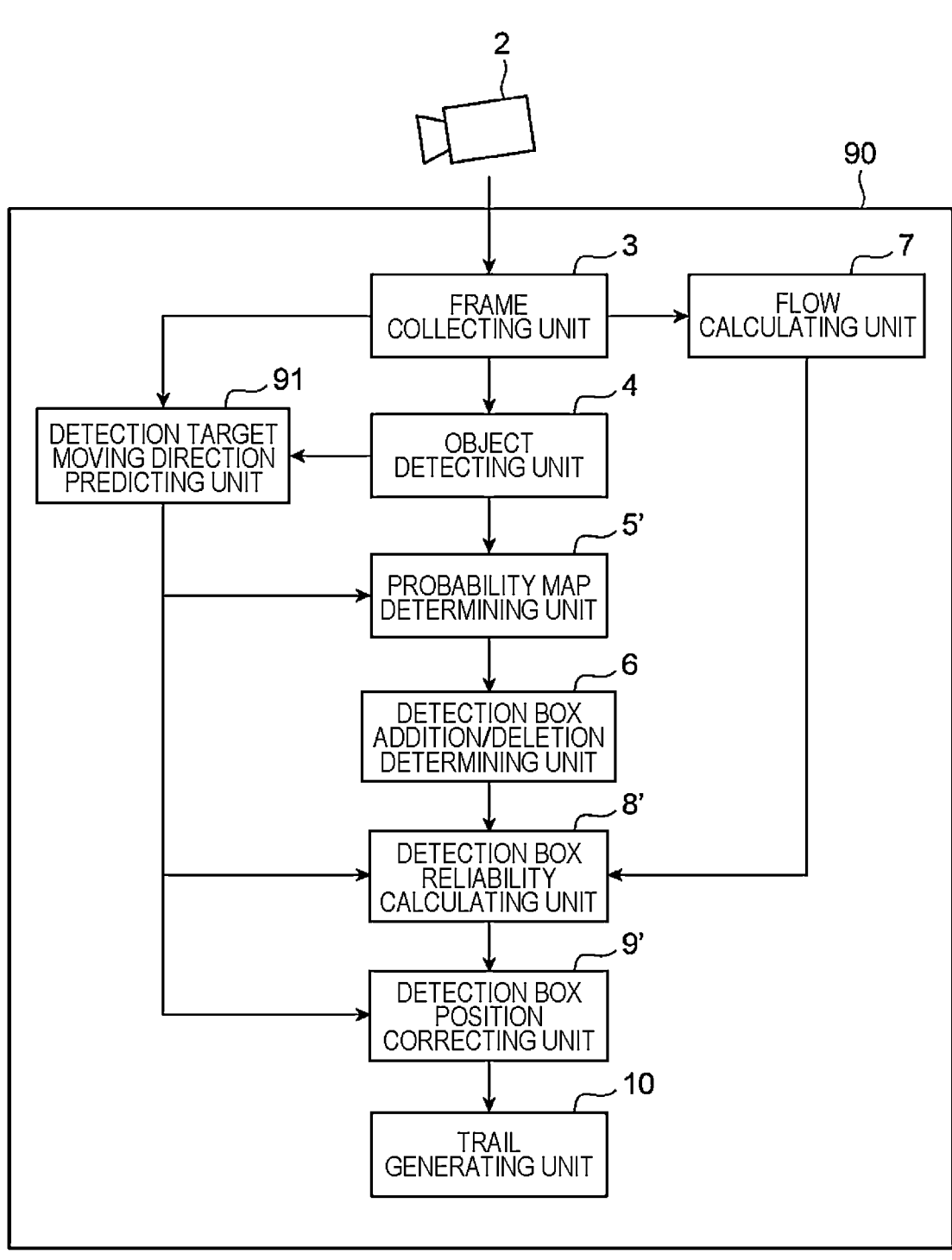
FIG. 11 is a functional block diagram of a second embodiment of the present invention.

FIG. 11 is a diagram illustrating a block configuration of a second embodiment of the present invention.

A characteristic feature of this embodiment is that an object tracking apparatus 90 includes a detection target moving direction predicting unit (object motion estimating unit) 91 that estimates a motion of an object. The object tracking apparatus 90 illustrated in FIG. 11 is an apparatus that generates a highly accurate trail of a detection target by predicting a moving direction of the detection target in advance and executing generation of a presence probability map, calculation of a reliability of a detection box, and position correction by using a result of the prediction. In FIG. 11, the frame collecting unit 3, the object detecting unit 4, a presence probability map determining unit 5', the detection box addition/deletion determining unit 6, the flow calculating unit 7, a detection box reliability calculating unit 8', a detection box position correcting unit 9', and the trail generating unit 10 have the same or substantially the same functions as those of the first embodiment.

The detection target moving direction predicting unit 91 estimates a motion of the object from any one or a plurality of items of information of the trail information generated by the trail generating unit 10, moving region candidate information of the detection target, object motion information around the detection target, and the medium information such as the vehicle in which the camera 2 that is a measurement device has been installed. The detection target moving direction predicting unit 91 illustrated in FIG. 11 has a function of predicting a moving direction of the detection target on the basis of the result of executing the image processing of all the frames acquired by the frame collecting unit 3 and the object detection result acquired from the object detecting unit 4. Hereinafter, the detection target moving direction predicting unit 91 and a method of generating the presence probability map, calculating the detection box reliability, and correcting the detection box position according to acquired surrounding environment information will be described.

FIG. 12 is a diagram illustrating a block configuration of the detection target moving direction predicting unit 91.

In FIG. 12, a moving region extracting unit 95 has a function of extracting a moving region of a detection target by analyzing frame information acquired from the frame collecting unit 3, a surrounding object information analyzing unit 96 has a function of recognizing a state or the like of an object around the detection target by using the object detection result acquired from the object detecting unit 4 and acquiring information on a moving direction or the like of a surrounding object, a control data acquiring unit 97 has a function of acquiring control data such as a steering angle or a traveling speed of the vehicle when the camera (measurement device) 2 is installed in the vehicle or the like, and a detection target moving direction output unit 98 has a function of estimating the moving direction of the detection target by analyzing the information acquired by the moving region extracting unit 95, the surrounding object information analyzing unit 96, and the control data acquiring unit 97 and outputting a result thereof to a processing block in a subsequent stage. Hereinafter, the functions 95, 96, and 98 will be described.

The moving region extracting unit 95 executes image processing of the frames, detects passage information in the building, outdoor sidewalk information, white line information, and the like, and extracts a moving region of the detection target. As an extraction method, there is a method of detecting an obstacle, a white line, or the like through object recognition, straight line detection, or the like, and extracting a region surrounded by the obstacle or the white line as a moving region of the detection target.

The surrounding object information analyzing unit 96 analyzes the object detection result, analyzes a detection result of an object present in the surroundings other than the detection target in all the frames, and acquires information of the motion state, the moving direction, or the like of the object. As an acquisition method, there is a method of applying the flow described in the first embodiment to an object other than the detection target and generating a trail of the object to acquire information indicating that the object is stopped or moving or information on a moving direction when the object is moving. In addition, instead of outputting the motion states of all the objects, a method of outputting the motion state of the selected object may be employed, and there is a method of using only the motion state of the object having a large number of highly reliable detection boxes.

The detection target moving direction output unit 98 estimates and outputs the moving direction of the detection target by using the acquired moving region of the detection target, a motion state of the surrounding object, and control data. Examples of a method of estimating the moving direction include a method of approximating a moving area of a detection target to a rectangular shape and determining the moving direction of the detection target as two directions on the assumption that a moving body moves forward and rearward in a long-side direction, a method of analyzing the motion state of a surrounding object and the control data, assuming that the detection target moves in the same manner as a surrounding target, determining that the detection target is stopped and setting the moving direction to 0 when the surrounding target is stopped, and determining the moving direction of the surrounding target as the moving direction of the detection target when the detection target is motioning, or the like.

A method of correcting information of the presence probability map, the detection box reliability, the detection box position, and the like from the moving direction of the detection target output by the detection target moving direction predicting unit 91 will be described. For example, as a method of correcting the presence probability map, when the position of the presence probability map of the corresponding frame is determined by using the presence probability maps of the previous and following frames in the presence probability map interpolating unit 22, a method of finely correcting a position of a map in a predicted moving direction of the detection target is conceivable. In addition, as a method of correcting the detection box reliability, a method of obtaining a moving direction of the center coordinates of the detection boxes of the detection target between the frames, and correcting the detection box of the corresponding frame to have high reliability when the moving direction is similar to the predicted moving direction of the detection target is conceivable. In addition, as a method of correcting the detection box position, a method of preferentially selecting frames in which the moving direction of the center coordinates of the detection boxes between the frames and the predicted moving direction of the detection target are similar when the detection box having a high reliability is selected by the high-reliability detection box selecting unit 81 is conceivable. In addition to the methods described above, there is no particular limitation as long as a method is a method enabling the predicted moving direction of the detection target to be compared with the moving direction of the detection target used by the flow described in the first embodiment and enabling the comparison to be used for correction.

In the second embodiment of the present invention, according to the functional configuration described above, in the object tracking apparatus that generates the trail of the object in the measurement range, the moving direction of the detection target is predicted in advance, the addition and deletion of the detection box is adjusted from the presence probability map information generated from the object detection result of each frame while using the information of the moving direction, and the detection box position is corrected according to the reliability calculated from the flow information, so that the highly accurate trail of the detection target can be output.

Third Embodiment

Figure 13:
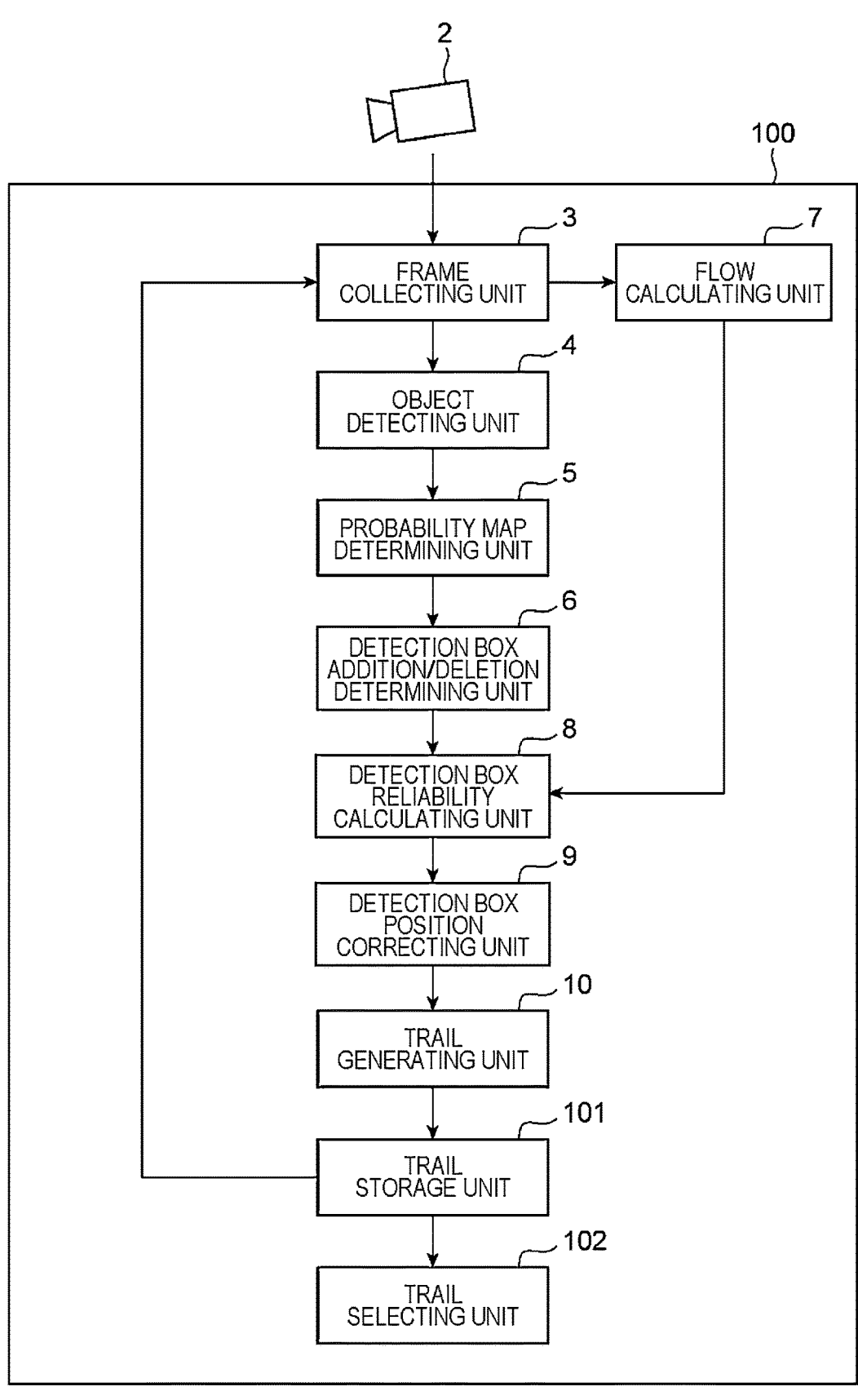
FIG. 13 is a functional block diagram of a third embodiment of the present invention.

FIG. 13 is a diagram illustrating a block configuration of a third embodiment of the present invention.

An object tracking apparatus 100 illustrated in FIG. 13 is an apparatus that adjusts addition and deletion of the detection box from the presence probability map information generated from the object detection result of each frame, generates a plurality of trails of the detection target by correcting the detection box position according to the reliability calculated from the flow information, and outputs a highly accurate trail of the detection target by selecting a highly accurate trail from the plurality of trails. In FIG. 13, the frame collecting unit 3, the object detecting unit 4, the presence probability map determining unit 5, the detection box addition/deletion determining unit 6, the flow calculating unit 7, the detection box reliability calculating unit 8, the detection box position correcting unit 9, and the trail generating unit 10 have the same functions as those of the first embodiment. The presence probability map determining unit 5 generates a plurality of presence probability maps of the detection target, the detection box reliability calculating unit 8 calculates a plurality of reliabilities of the detection target, and the detection box position correcting unit 9 generates a plurality of detection box positions of the detection target.

The trail generating unit 10 generates a plurality of trails using information on a plurality of presence probability maps, a plurality of detection box reliabilities, and a plurality of detection box positions. Accordingly, a trail storage unit 101 has a function of storing the generated trail, and the trail selecting unit 102 has a function of allowing a user to manually select any one trail from the stored trails by using a GUI or the like.

In this embodiment, the trail generating unit 10 prepares a plurality of patterns of the presence probability map of the detection target, the detection box reliability, and the method for correcting detection box position in the same frame, and generates a plurality of trails of the same target. For example, the presence probability map determining unit 5 can generate a plurality of presence probability maps by using a technique of generating or interpolating the presence probability map, the technique using a different algorithm, or by changing the pattern of the region selected by the presence probability map selecting unit 23. In addition, the detection box reliability calculating unit 8 can have a plurality of reliabilities by changing a reliability calculation algorithm, and the detection box position correcting unit 9 can generate a plurality of items of detection box information by changing a pattern of the association method of the detection target associating unit 80 and a pattern of the high-reliability detection box selection.

In the trail selecting unit 102, images of all the frames to which the position-corrected detection boxes are imparted, for the detection target, and trails generated from the detection boxes are defined as sets and displayed on a GUI screen for each trail, and thereby a trail considered to be optimal by the user can be selected.

In the third embodiment of the present invention, according to the functional configuration described above, in the object tracking apparatus that generates the trail of the object in the measurement range, the plurality of trails generated by the flow of the first embodiment are visualized on the GUI screen or the like while the algorithm in each processing block is changed and the plurality of trails are stored, so that the user can select the highly accurate trail of the detection target.

Although the embodiments of the present invention have been described in detail above, the present invention is not limited to the above embodiments, and various design changes can be made without departing from the spirit of the present invention described in the claims. For example, the above-described embodiments have been described in detail in order to describe the present invention in an easy-to-understand manner and are not necessarily limited to those having all the described configurations. In addition, a part of a configuration of a certain embodiment may be replaced with a configuration of another embodiment, or the configuration of the other embodiment may be added to the configuration of the certain embodiment. Further, it is possible to add, remove, and replace other configurations for a part of the configuration of each embodiment.

REFERENCE SIGNS LIST

1 object tracking apparatus
2 camera (sensor)

3 frame collecting unit
4 object detecting unit
5 presence probability map determining unit
6 detection box addition/deletion determining unit
7 flow calculating unit
8 detection box reliability calculating unit
9 detection box position correcting unit
10 trail generating unit
11 captured image
12, 13 detection target
14 detection box
15 detection box information

The invention claimed is:

1. An object tracking apparatus that generates a trail of an object within a measurement range of a sensor, the object tracking apparatus comprising an arithmetic device configured to:

detect an object for each of a plurality of frames acquired by the sensor;

calculate a reliability of a detection box based on flow information between frames within the detection box of the detected object;

correct detection box information of a low-reliability detection box having a reliability lower than a reliability of a high-reliability detection box, by using detection box information of the high-reliability detection box having a reliability higher than a threshold;

generate the trail using the corrected detection box information;

generate a presence probability map indicating a presence of the object in each of the plurality of frames;

determine addition or deletion of the detection box in each of the plurality of frames, using the presence probability map;

create a presence probability map in each frame from the detection box information output;

interpolate information of presence probability maps of two or more previous and following frames of a target frame included in the plurality of frames to generate an interpolated presence probability map of the target frame; and compare the presence probability map with the interpolated presence probability map and select a final presence probability map.

2. The object tracking apparatus according to claim 1, wherein the arithmetic device is further configured to calculate the reliability of the detection box based on information of a three-dimensional object feature point and a road surface feature point in the detection box.

3. The object tracking apparatus according to claim 1, wherein the arithmetic device is further configured to correct information on a position, a vertical width, and a horizontal width of the low-reliability detection box, using information on positions, vertical widths, and horizontal widths of the plurality of high-reliability detection boxes.

4. The object tracking apparatus according to claim 1, wherein the arithmetic device is further configured to create the presence probability map by using any one or a plurality of items of information of a probability density function calculated by a normal distribution from positional information and the reliability information of a detection box of an object detected unit and an object detection result from a plurality of different dictionaries.

5. The object tracking apparatus according to claim 4, wherein the arithmetic device is further configured to estimate a motion of the object.

6. The object tracking apparatus according to claim 5, wherein the arithmetic device is further configured to estimate the motion of the object from any one or a plurality of items of information of trail information, moving region candidate information of the object, object motion information around the object, and medium information in which the sensor is installed.

7. The object tracking apparatus according to claim 6, wherein the presence probability map, the reliability of the detection box, and the position of the detection box are corrected again using the object motion information.

8. The object tracking apparatus according to claim 1, wherein the arithmetic device is further configured to:

generate a plurality of presence probability maps of the object, calculate a plurality of reliabilities of the object, correct a plurality of detection box positions of the object, and generate a plurality of trails using the plurality of presence probability maps, the plurality of reliabilities, and the plurality of items of detection box information, and select any one of the plurality of trails.

9. The object tracking apparatus according to claim 2, wherein the arithmetic device is further configured to correct information on a position, a vertical width, and a horizontal width of the low-reliability detection box, using information on positions, vertical widths, and horizontal widths of the plurality of high-reliability detection boxes.

\* \* \* \* \*